US009465461B2

(12) United States Patent
Holz (10) Patent No.: US 9,465,461 B2
(45) Date of Patent: Oct. 11, 2016

(54) OBJECT DETECTION AND TRACKING WITH AUDIO AND OPTICAL SIGNALS (71) Applicant: Leap Motion, Inc., San Francisco, CA (US)

(72) Inventor: David Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 0 days.

(21) Appl. No.: 14/149,709

(22) Filed: Jan. 7, 2014

(65) Prior Publication Data

US 2014/0192024 A1 Jul. 10, 2014

Related U.S. Application Data (60) Provisional application No. 61/750,007, filed on Jan. 8, 2013.

(51) Int. Cl.
*G06F 3/041* (2006.01)
*G06F 3/042* (2006.01)
(Continued)

(52) U.S. Cl.
CPC ............ *G06F 3/041* (2013.01); *G06F 3/043* (2013.01); *G06F 3/0425* (2013.01); *H04N 5/23241* (2013.01)

(58) Field of Classification Search
CPC ................. G06F 2203/04106; G06F 3/042; G06F 3/043; G06F 3/0421; G06F 3/0423; G06F 3/0425; G06F 3/0426; G06F 3/0428; G06F 3/0304; G06F 3/033; G06F 3/0317; G06F 3/0308; G06F 3/0312; G06F 3/0325; H04N 5/23251
See application file for complete search history.

(56) References Cited

U.S. PATENT DOCUMENTS

| 2,665,041 A | 1/1954 | Maffucci |
| 4,175,862 A | 11/1979 | DiMatteo et al. |

(Continued)

FOREIGN PATENT DOCUMENTS

| CN | 1984236 A | 6/2007 |
| CN | 101478671 A | 7/2009 |

(Continued)

OTHER PUBLICATIONS

U.S. Appl. No. 14/149,676—Non Final Office Action dated Dec. 17, 2015, 19 pages.

(Continued)

*Primary Examiner* — Grant Sitta
*Assistant Examiner* — Amen Bogale
(74) *Attorney, Agent, or Firm* — Haynes Beffel & Wolfeld LLP; Ernest J. Beffel, Jr.

(57) ABSTRACT

The technology disclosed addresses these problems by supplementing optical gesture recognition with the ability to recognize touch gestures. This capability allows the user to execute intuitive gestures involving contact with a surface. For example, in low-light situations where free-form gestures cannot be recognized optically with a sufficient degree of reliability, a device implementing the invention may switch to a touch mode in which touch gestures are recognized. In implementations, two contact microphones or other vibratory or acoustical sensors, that are coupled to an optical motion-capture and are in contact with a surface that a user touches, are monitored. When the contact microphones detect audio signals (or other vibrational phenomena) generated by contact of an object with the surface that the user touches, a position of the object traveling across and in contact with the surface is tracked.

16 Claims, 5 Drawing Sheets

(51) Int. Cl.
*H04N 5/232* (2006.01)
*G06F 3/043* (2006.01)

(56) References Cited

U.S. PATENT DOCUMENTS

| | | | |
|---|---|---|---|
| 4,879,659 A | 11/1989 | Bowlin et al. | |
| 5,134,661 A | 7/1992 | Reinsch | |
| 5,282,067 A | 1/1994 | Liu | |
| 5,434,617 A | 7/1995 | Bianchi | |
| 5,454,043 A | 9/1995 | Freeman | |
| 5,455,561 A | 10/1995 | Brown | |
| 5,574,511 A | 11/1996 | Yang et al. | |
| 5,581,276 A | 12/1996 | Cipolla et al. | |
| 5,594,469 A | 1/1997 | Freeman et al. | |
| 5,691,737 A | 11/1997 | Ito et al. | |
| 5,742,263 A | 4/1998 | Wang et al. | |
| 5,900,863 A | 5/1999 | Numazaki | |
| 5,940,538 A | 8/1999 | Spiegel et al. | |
| 6,002,808 A | 12/1999 | Freeman | |
| 6,031,161 A | 2/2000 | Baltenberger | |
| 6,031,661 A | 2/2000 | Tanaami | |
| 6,072,494 A | 6/2000 | Nguyen | |
| 6,075,895 A | 6/2000 | Qiao et al. | |
| 6,147,678 A | 11/2000 | Kumar et al. | |
| 6,154,558 A | 11/2000 | Hsieh | |
| 6,181,343 B1 | 1/2001 | Lyons | |
| 6,184,326 B1 | 2/2001 | Razavi et al. | |
| 6,184,926 B1 | 2/2001 | Khosravi et al. | |
| 6,195,104 B1 | 2/2001 | Lyons | |
| 6,204,852 B1 | 3/2001 | Kumar et al. | |
| 6,252,598 B1 | 6/2001 | Segen | |
| 6,263,091 B1 | 7/2001 | Jain et al. | |
| 6,417,970 B1 | 7/2002 | Travers et al. | |
| 6,492,986 B1 | 12/2002 | Metaxas et al. | |
| 6,493,041 B1 | 12/2002 | Hanko et al. | |
| 6,498,628 B2 | 12/2002 | Iwamura | |
| 6,578,203 B1 | 6/2003 | Anderson, Jr. et al. | |
| 6,603,867 B1 | 8/2003 | Sugino et al. | |
| 6,661,918 B1 | 12/2003 | Gordon et al. | |
| 6,674,877 B1 | 1/2004 | Jojic et al. | |
| 6,702,494 B2 | 3/2004 | Dumler et al. | |
| 6,734,911 B1 | 5/2004 | Lyons | |
| 6,798,628 B1 | 9/2004 | Macbeth | |
| 6,804,654 B2 | 10/2004 | Kobylevsky et al. | |
| 6,804,656 B1 | 10/2004 | Rosenfeld et al. | |
| 6,814,656 B2 | 11/2004 | Rodriguez | |
| 6,819,796 B2 | 11/2004 | Hong et al. | |
| 6,919,880 B2 | 7/2005 | Morrison et al. | |
| 6,950,534 B2 | 9/2005 | Cohen et al. | |
| 6,993,157 B1 | 1/2006 | Oue et al. | |
| 7,152,024 B2 | 12/2006 | Marschner et al. | |
| 7,213,707 B2 | 5/2007 | Hubbs et al. | |
| 7,215,828 B2 | 5/2007 | Luo | |
| 7,244,233 B2 | 7/2007 | Krantz et al. | |
| 7,257,237 B1 | 8/2007 | Luck et al. | |
| 7,259,873 B2 | 8/2007 | Sikora et al. | |
| 7,308,112 B2 | 12/2007 | Fujimura et al. | |
| 7,340,077 B2 | 3/2008 | Gokturk et al. | |
| 7,519,223 B2 | 4/2009 | Dehlin et al. | |
| 7,532,206 B2 | 5/2009 | Morrison et al. | |
| 7,536,032 B2 | 5/2009 | Bell | |
| 7,542,586 B2 | 6/2009 | Johnson | |
| 7,598,942 B2 | 10/2009 | Underkoffler et al. | |
| 7,606,417 B2 | 10/2009 | Steinberg et al. | |
| 7,646,372 B2 | 1/2010 | Marks et al. | |
| 7,656,372 B2 | 2/2010 | Sato et al. | |
| 7,665,041 B2 | 2/2010 | Wilson et al. | |
| 7,692,625 B2 | 4/2010 | Morrison et al. | |
| 7,831,932 B2 | 11/2010 | Josephsoon et al. | |
| 7,840,031 B2 | 11/2010 | Albertson et al. | |
| 7,861,188 B2 | 12/2010 | Josephsoon et al. | |
| 7,940,885 B2 | 5/2011 | Stanton et al. | |
| 7,948,493 B2 | 5/2011 | Klefenz et al. | |
| 7,961,174 B1 | 6/2011 | Markovic et al. | |
| 7,961,934 B2 | 6/2011 | Thrun et al. | |
| 7,971,156 B2 | 6/2011 | Albertson et al. | |
| 7,980,885 B2 | 7/2011 | Gattwinkel et al. | |
| 8,064,704 B2 | 11/2011 | Kim et al. | |
| 8,085,339 B2 | 12/2011 | Marks | |
| 8,086,971 B2 | 12/2011 | Radivojevic et al. | |
| 8,111,239 B2 | 2/2012 | Pryor et al. | |
| 8,112,719 B2 | 2/2012 | Hsu et al. | |
| 8,144,233 B2 | 3/2012 | Fukuyama | |
| 8,185,176 B2 | 5/2012 | Mangat et al. | |
| 8,213,707 B2 | 7/2012 | Li et al. | |
| 8,218,858 B2 | 7/2012 | Gu | |
| 8,229,134 B2 | 7/2012 | Duraiswami et al. | |
| 8,244,233 B2 | 8/2012 | Chang et al. | |
| 8,249,345 B2 | 8/2012 | Wu et al. | |
| 8,289,162 B2 | 10/2012 | Mooring et al. | |
| 8,290,208 B2 | 10/2012 | Kurtz et al. | |
| 8,304,727 B2 | 11/2012 | Lee et al. | |
| 8,514,221 B2 | 8/2013 | King et al. | |
| 8,631,355 B2 | 1/2014 | Murillo et al. | |
| 8,638,989 B2 | 1/2014 | Holz | |
| 8,659,594 B2 | 2/2014 | Kim et al. | |
| 8,659,658 B2 | 2/2014 | Vassigh et al. | |
| 8,693,731 B2 | 4/2014 | Holz et al. | |
| 8,738,523 B1 | 5/2014 | Sanchez et al. | |
| 8,744,122 B2 | 6/2014 | Salgian et al. | |
| 8,817,087 B2 | 8/2014 | Weng et al. | |
| 8,842,084 B2 | 9/2014 | Andersson et al. | |
| 8,843,857 B2 | 9/2014 | Berkes et al. | |
| 8,872,914 B2 | 10/2014 | Gobush | |
| 8,929,609 B2 | 1/2015 | Padovani et al. | |
| 8,930,852 B2 | 1/2015 | Chen et al. | |
| 8,942,881 B2 | 1/2015 | Hobbs et al. | |
| 8,954,340 B2 | 2/2015 | Sanchez et al. | |
| 8,957,857 B2 | 2/2015 | Lee et al. | |
| 8,982,104 B1* | 3/2015 | Fujishima | 345/177 |
| 9,056,396 B1 | 6/2015 | Linnell | |
| 9,070,019 B2 | 6/2015 | Holz | |
| 2002/0008211 A1 | 1/2002 | Kask | |
| 2002/0080094 A1 | 6/2002 | Biocca et al. | |
| 2002/0105484 A1 | 8/2002 | Navab et al. | |
| 2003/0053658 A1 | 3/2003 | Pavlidis | |
| 2003/0053659 A1 | 3/2003 | Pavlidis et al. | |
| 2003/0123703 A1 | 7/2003 | Pavlidis et al. | |
| 2003/0132950 A1* | 7/2003 | Surucu et al. | 345/700 |
| 2003/0152289 A1 | 8/2003 | Luo | |
| 2003/0202697 A1 | 10/2003 | Simard et al. | |
| 2004/0125228 A1 | 7/2004 | Dougherty | |
| 2004/0145809 A1 | 7/2004 | Brenner | |
| 2004/0212725 A1 | 10/2004 | Raskar | |
| 2005/0007673 A1 | 1/2005 | Chaoulov et al. | |
| 2005/0068518 A1 | 3/2005 | Baney et al. | |
| 2005/0131607 A1 | 6/2005 | Breed | |
| 2005/0156888 A1 | 7/2005 | Xie et al. | |
| 2005/0168578 A1 | 8/2005 | Gobush | |
| 2005/0236558 A1 | 10/2005 | Nabeshima et al. | |
| 2006/0017807 A1 | 1/2006 | Lee et al. | |
| 2006/0072105 A1 | 4/2006 | Wagner | |
| 2006/0204040 A1 | 9/2006 | Freeman et al. | |
| 2006/0210112 A1 | 9/2006 | Cohen et al. | |
| 2006/0290950 A1 | 12/2006 | Platt et al. | |
| 2007/0042346 A1 | 2/2007 | Weller | |
| 2007/0065140 A1 | 3/2007 | Sorsa | |
| 2007/0086621 A1 | 4/2007 | Aggarwal et al. | |
| 2007/0130547 A1 | 6/2007 | Boillot | |
| 2007/0206719 A1 | 9/2007 | Suryanarayanan et al. | |
| 2007/0238956 A1 | 10/2007 | Haras et al. | |
| 2008/0013826 A1 | 1/2008 | Hillis et al. | |
| 2008/0019576 A1 | 1/2008 | Senftner et al. | |
| 2008/0031492 A1 | 2/2008 | Lanz | |
| 2008/0056752 A1 | 3/2008 | Denton et al. | |
| 2008/0064954 A1 | 3/2008 | Adams et al. | |
| 2008/0106637 A1 | 5/2008 | Nakao et al. | |
| 2008/0106746 A1 | 5/2008 | Shpunt et al. | |
| 2008/0110994 A1 | 5/2008 | Knowles et al. | |
| 2008/0118091 A1 | 5/2008 | Serfaty et al. | |
| 2008/0187175 A1 | 8/2008 | Kim et al. | |
| 2008/0244468 A1 | 10/2008 | Nishihara et al. | |
| 2008/0273764 A1 | 11/2008 | Scholl | |
| 2008/0278589 A1 | 11/2008 | Thorn | |

(56) References Cited

U.S. PATENT DOCUMENTS

| | | |
|---|---|---|
| 2008/0304740 A1 | 12/2008 | Sun et al. |
| 2008/0319356 A1 | 12/2008 | Cain et al. |
| 2009/0002489 A1 | 1/2009 | Yang et al. |
| 2009/0093307 A1 | 4/2009 | Miyaki |
| 2009/0102840 A1 | 4/2009 | Li |
| 2009/0103780 A1 | 4/2009 | Nishihara et al. |
| 2009/0116742 A1 | 5/2009 | Nishihara |
| 2009/0122146 A1 | 5/2009 | Zalewski et al. |
| 2009/0203993 A1 | 8/2009 | Mangat et al. |
| 2009/0203994 A1 | 8/2009 | Mangat et al. |
| 2009/0217211 A1 | 8/2009 | Hildreth et al. |
| 2009/0257623 A1 | 10/2009 | Tang et al. |
| 2009/0274339 A9 | 11/2009 | Cohen et al. |
| 2009/0309710 A1 | 12/2009 | Kakinami |
| 2010/0013832 A1 | 1/2010 | Xiao et al. |
| 2010/0020078 A1 | 1/2010 | Shpunt |
| 2010/0023015 A1 | 1/2010 | Park |
| 2010/0026963 A1 | 2/2010 | Faulstich |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0058252 A1 | 3/2010 | Ko |
| 2010/0066737 A1 | 3/2010 | Liu |
| 2010/0066975 A1 | 3/2010 | Rehnstrom |
| 2010/0118123 A1 | 5/2010 | Freedman et al. |
| 2010/0125815 A1 | 5/2010 | Wang et al. |
| 2010/0141762 A1 | 6/2010 | Siann et al. |
| 2010/0158372 A1 | 6/2010 | Kim et al. |
| 2010/0177929 A1 | 7/2010 | Kurtz et al. |
| 2010/0201880 A1 | 8/2010 | Iwamura |
| 2010/0219934 A1 | 9/2010 | Matsumoto |
| 2010/0220552 A1* | 9/2010 | Owaki ............... G01S 3/8083 367/127 |
| 2010/0222102 A1 | 9/2010 | Rodriguez |
| 2010/0264833 A1 | 10/2010 | Van Endert et al. |
| 2010/0277411 A1 | 11/2010 | Yee et al. |
| 2010/0296698 A1 | 11/2010 | Lien et al. |
| 2010/0302357 A1 | 12/2010 | Hsu et al. |
| 2010/0303298 A1 | 12/2010 | Marks et al. |
| 2010/0306712 A1 | 12/2010 | Snook et al. |
| 2010/0309097 A1 | 12/2010 | Raviv et al. |
| 2011/0007072 A1 | 1/2011 | Khan et al. |
| 2011/0026765 A1 | 2/2011 | Ivanich et al. |
| 2011/0043806 A1 | 2/2011 | Guetta et al. |
| 2011/0057875 A1 | 3/2011 | Shigeta et al. |
| 2011/0080470 A1 | 4/2011 | Kuno et al. |
| 2011/0080490 A1 | 4/2011 | Clarkson et al. |
| 2011/0093820 A1 | 4/2011 | Zhang et al. |
| 2011/0096033 A1 | 4/2011 | Ko |
| 2011/0107216 A1 | 5/2011 | Bi |
| 2011/0115486 A1 | 5/2011 | Frohlich et al. |
| 2011/0116684 A1 | 5/2011 | Coffman et al. |
| 2011/0119640 A1 | 5/2011 | Berkes et al. |
| 2011/0134112 A1 | 6/2011 | Koh et al. |
| 2011/0148875 A1 | 6/2011 | Kim et al. |
| 2011/0169726 A1 | 7/2011 | Holmdahl et al. |
| 2011/0173574 A1 | 7/2011 | Clavin et al. |
| 2011/0181509 A1 | 7/2011 | Rautiainen et al. |
| 2011/0193778 A1 | 8/2011 | Lee et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0234840 A1 | 9/2011 | Klefenz et al. |
| 2011/0261178 A1 | 10/2011 | Lo et al. |
| 2011/0267259 A1 | 11/2011 | Tidemand et al. |
| 2011/0279397 A1 | 11/2011 | Rimon et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2011/0310220 A1 | 12/2011 | McEldowney |
| 2011/0314427 A1 | 12/2011 | Sundararajan |
| 2012/0038637 A1 | 2/2012 | Marks |
| 2012/0050157 A1 | 3/2012 | Latta et al. |
| 2012/0065499 A1 | 3/2012 | Chono |
| 2012/0068914 A1 | 3/2012 | Jacobsen et al. |
| 2012/0163675 A1 | 6/2012 | Joo et al. |
| 2012/0194517 A1 | 8/2012 | Izadi et al. |
| 2012/0204133 A1 | 8/2012 | Guendelman et al. |
| 2012/0223959 A1 | 9/2012 | Lengeling |
| 2012/0236288 A1 | 9/2012 | Stanley |
| 2012/0239174 A1* | 9/2012 | Shotton ............. G06K 9/00362 700/93 |
| 2012/0250936 A1 | 10/2012 | Holmgren |
| 2012/0270654 A1 | 10/2012 | Padovani et al. |
| 2012/0274781 A1 | 11/2012 | Shet et al. |
| 2013/0019204 A1 | 1/2013 | Kotler et al. |
| 2013/0148852 A1 | 6/2013 | Partis et al. |
| 2013/0162600 A1* | 6/2013 | Chou .................. G06F 3/04883 345/175 |
| 2013/0239059 A1 | 9/2013 | Chen et al. |
| 2013/0241832 A1 | 9/2013 | Rimon et al. |
| 2013/0257736 A1 | 10/2013 | Hou et al. |
| 2014/0049518 A1* | 2/2014 | Hunt .................... G06F 3/0416 345/176 |
| 2014/0081521 A1 | 3/2014 | Frojdh et al. |
| 2014/0085203 A1 | 3/2014 | Kobayashi |
| 2014/0125813 A1 | 5/2014 | Holz |
| 2014/0139641 A1 | 5/2014 | Holz |
| 2014/0161311 A1 | 6/2014 | Kim |
| 2014/0168062 A1 | 6/2014 | Katz et al. |
| 2014/0177913 A1 | 6/2014 | Holz |
| 2014/0189579 A1 | 7/2014 | Rimon et al. |
| 2014/0222385 A1 | 8/2014 | Muenster et al. |
| 2014/0253512 A1 | 9/2014 | Narikawa et al. |
| 2014/0307920 A1 | 10/2014 | Holz |
| 2014/0364212 A1 | 12/2014 | Osman et al. |
| 2014/0375547 A1 | 12/2014 | Katz et al. |
| 2015/0003673 A1 | 1/2015 | Fletcher |
| 2015/0016777 A1 | 1/2015 | Abovitz et al. |
| 2015/0022447 A1 | 1/2015 | Hare et al. |
| 2015/0029091 A1 | 1/2015 | Nakashima et al. |
| 2015/0115802 A1 | 4/2015 | Kuti et al. |
| 2015/0116214 A1 | 4/2015 | Grunnet-Jepsen et al. |
| 2015/0131859 A1 | 5/2015 | Kim et al. |

FOREIGN PATENT DOCUMENTS

| | | |
|---|---|---|
| CN | 201332447 Y | 10/2009 |
| CN | 101729808 A | 6/2010 |
| CN | 101930610 A | 12/2010 |
| CN | 101951474 A | 1/2011 |
| CN | 102053702 A | 5/2011 |
| CN | 201859393 U | 6/2011 |
| CN | 102201121 A | 9/2011 |
| CN | 102236412 A | 11/2011 |
| DE | 4201934 A1 | 7/1993 |
| DE | 102007015495 A1 | 10/2007 |
| DE | 102007015497 B4 | 1/2014 |
| EP | 892 IN 0772 169 A2 | 5/1997 |
| EP | 0999542 A1 | 5/2000 |
| EP | 1477924 A2 | 11/2004 |
| EP | 1837665 A2 | 9/2007 |
| EP | 2369443 A2 | 9/2011 |
| GB | 2419433 A | 4/2006 |
| GB | 2480140 A | 11/2011 |
| GB | 2519418 A | 4/2015 |
| JP | H08261721 A | 10/1996 |
| JP | H09259278 A | 10/1997 |
| JP | 2000023038 A | 1/2000 |
| JP | 2002133400 A | 5/2002 |
| JP | 2003256814 A | 9/2003 |
| JP | 2004246252 A | 9/2004 |
| JP | 2006019526 A | 1/2006 |
| JP | 2006259829 A | 9/2006 |
| JP | 2007272596 A | 10/2007 |
| JP | 2008227569 A | 9/2008 |
| JP | 2009031939 A | 2/2009 |
| JP | 2009037594 A | 2/2009 |

(56) References Cited

FOREIGN PATENT DOCUMENTS

| JP | 2011010258 A | 1/2011 |
|---|---|---|
| JP | 2011065652 A | 3/2011 |
| JP | 4906960 B2 | 3/2012 |
| KR | 101092909 B1 | 6/2011 |
| RU | 2422878 C1 | 6/2011 |
| TW | 200844871 A | 11/2008 |
| WO | 9426057 A1 | 11/1994 |
| WO | 2004114220 A1 | 12/2004 |
| WO | 2006020846 A2 | 2/2006 |
| WO | 2007137093 A2 | 11/2007 |
| WO | 201007662 A1 | 1/2010 |
| WO | 2010032268 A2 | 3/2010 |
| WO | 2010076622 A1 | 7/2010 |
| WO | 2010088035 A2 | 8/2010 |
| WO | 20100138741 A1 | 12/2010 |
| WO | 2011024193 A2 | 3/2011 |
| WO | 2011036618 A2 | 3/2011 |
| WO | 2011044680 A1 | 4/2011 |
| WO | 2011045789 A1 | 4/2011 |
| WO | 2011119154 A1 | 9/2011 |
| WO | 2012027422 A2 | 3/2012 |
| WO | 2013109608 A2 | 7/2013 |
| WO | 2013109609 A2 | 7/2013 |
| WO | 2014208087 A1 | 12/2014 |
| WO | 2015026707 A1 | 2/2015 |

OTHER PUBLICATIONS

Multilateration. Wikipedia (the free encyclopedia) [online]. Nov. 16, 2012 [retrieved on Jan. 2, 2014]. Retrieved from the internet: <http://en.wikipedia.org/w/index.php?title=Multilateration&oldid=523281858>. 9 pages.

Jesse, V., Acoustic source localization. Wikipedia (the free encyclopedia) [online]. 03:28, Dec. 24, 2012 [retrieved on Jan. 2, 2014]. Retrieved from the internet: <http://en.wikipedia.org/w/index.php?title=Acoustic_source_localization&oldid=529531982>. 3 pages.

U.S. Appl. No. 14/149,676—Non Final Office Action dated Jan. 30, 2015, 11 pages.

Ehliar, A., et al, "Benchmarking Network Processors," Department of Electrical Engineering, Linkoping University, Sweden, Copyright 2004, 4 pages.

Texas Instruments, "QVGA 3D Time-of-Flight Sensor," Product Overview: OPT 8140, Dec. 2013, Texas Instruments Incorporated, 10 pages.

Texas Instruments, "4-Channel, 12-Bit, 80-MSPS ADC," VSP5324, Revised Nov. 2012, Texas Instruments Incorporated, 55 pages.

Texas Instruments, "Time-of-Flight Controller (TFC)," Product Overview; OPT9220, Jan. 2014, Texas Instruments Incorporated, 43 pages.

Dombeck, D., et al., "Optical Recording of Action Potentials with Second-Harmonic Generation Microscopy," The Journal of Neuroscience, Jan. 28, 2004, vol. 24(4): pp. 999-1003.

Davis, et al., "Toward 3-D Gesture Recognition," International Journal of Pattern Recognition and Artificial Intelligence, MIT Media Lab, Copyright 1999, pp. 1-16.

Butail, S., et al., "Three-Dimensional Reconstruction of the Fast-Start Swimming Kinematics of Densely Schooling Fish," Journal of the Royal Society Interface, Jun. 3, 2011, retrieved from the Internet <http://www.ncbi.nlm.nih.gov/pubmed/21642367>, pp. 0, 1-12.

Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.

Barat, et al., "Feature Correspondences from Multiple Views of Coplanar Ellipses" Author manuscript, published in 2nd International Symposium on Visual Computing, Lake Tahoe, Nevada, United States (2006), 10 pages.

Cheikh, et al., "Multipeople Tracking Across Multiple Cameras," International Journal on New Computer Architectures and Their Applications (IJNCAA) 2(1): 23-33 The Society of Digital Information and Wireless Communications, Copyright 2012. Cited by Applicant. pp. 23-33.

Rasmussen, "An Analytical Framework for the Preparation and Animation of a Virtual Mannequin for the Purpose of Mannequin-Clothing Interaction Modeling," Thesis for Master of Science in Civil and Environmental ENgineering, Graduate College of The University of Iowa, Copyright Dec. 2008, 98 pages.

Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.

Heikkila, "Accurate Camera Calibration and Feature Based 3-D Reconstruction From Monocular Image Sequences," Infotech Oulu and Department of Electrical Engineering, University of Oulu, Finland, Oulu, Oct. 10, 1997, pp. 1-126.

PCT/US2013/021713, International Search Report and Written Opinion, Sep. 11, 2013, 7 pages (WO 2013/109609).

Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: <http://liu.diva-portal.org/smash/get/diva2:18671/FULLTEXT01> on Jun. 17, 2013, 52 pages.

Forbes, K, et al., "Using Silhouette Consistency Constraints to Build 3D Models," University of Cape Town, Copyright De Beers 2003, Retrieved from the internet: <http://www.dip.ee.uct.ac.za/~kforbes/Publications/Forbes2003Prasa.pdf> on Jun. 17, 2013, 6 pages.

May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.

Kanhangad, V., et al., "A Unified Framework for Contactless Hand Verification," IEEE Transactions on Information Forensics and Security, IEEE, Piscataway, NJ, US., vol. 6, No. 3, Sep. 1, 2011, pp. 1014-1027.

Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.

PCT/US2013/021709—International Search Report and Written Opinion dated Sep. 12, 2013, 7 pages (WO 2013/109608).

Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.

Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.

Chung, et al., "International Journal of Computer Vision: RecoveringLSHGCs and SHGCs from Stereo" [on-line], Oct. 1996 [retrieved on Apr. 10, 2014], Kluwer Academic Publishers, vol. 20, issue 1-2, Retrieved from the Internet: http://link.springer.com/article/10.1007/BF00144116#, pp. 43-58.

Bardinet, et al., "Fitting of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeexplore.ieee.org/xpls/abs_all.jsp?arnumber=315882&tag=1, pp. 184-193.

U.S. Appl. No. 13/742,845—Non-Final Office Action dated Jul. 22, 2013, 19 pages.

U.S. Appl. No. 13/742,845—Notice of Allowance dated Dec. 5, 2013, 23 pages.

U.S. Appl. No. 13/742,953—Non-Final Office Action dated Jun. 14, 2013, 13 pages.

U.S. Appl. No. 13/742,953—Notice of Allowance dated Nov. 4, 2013, 14 pages.

PCT/US2013/021709—International Preliminary Report on Patentability, Jul. 22, 2014, 22 pages. (WO 2013/109608).

PCT/US2013/021713—International Preliminary Report on Patentability, Jul. 22, 2014, 13 pages, (WO 2013/109609).

U.S. Appl. No. 13/414,485—Non Final Office Action dated May 19, 2014, 16 pages.

(56) References Cited

OTHER PUBLICATIONS

U.S. Appl. No. 13/414,485—Final Office Action dated Feb. 2, 2015, 30 pages.
U.S. Appl. No. 14/149,676—Final Office Action dated Aug. 27, 2015, 15 pages.
PCT/US2013/069231—International Search Report and Written Opinion (Corrected Version), mailing date Mar. 13, 2014 (received date Mar. 20, 2014), 7 pages.
U.S. Appl. No. 13/744,810—Non Final Office Action dated Jun. 7, 2013, 15 pages.
U.S. Appl. No. 13/744,810—Final Office Action dated Dec. 16, 2013, 18 pages.
PCT/US2013/021713—International Search Report and Written Opinion, Sep. 11, 2013, 7 pages.
Cumani, A., et al., "Pattern Recognition: Recovering the 3D Structure of Tubular Objects From Stereo Silhouettes," Pattern Recognition, Elsevier, GB, vol. 30, No. 7, Jul. 1, 1997, Retrieved from the Internet: <http://www.sciencedirect.com/science/article/pii/S0031320396001446>, pp. 1051-1059.
PCT/US2013/021709—International Search Report and Written Opinion dated Sep. 12, 2013, 22 pages.
PCT/US2013/069231—International Preliminary Report with Written Opinion dated May 12, 2015, 8 pages.
U.S. Appl. No. 14/106,148—Non Final Office Action dated Jul. 6, 2015, 14 pages.
U.S. Appl. No. 14/250,758—Non Final Office Action dated Jul. 6, 2015, 8 pages.
U.S. Appl. No. 13/414,485—Non Final Office Action dated Jul. 30, 2015, 22 pages.
U.S. Appl. No. 13/744,810—Notice of Allowance dated Nov. 6, 2015, 8 pages.
U.S. Appl. No. 13/744,810—Notice of Allowance dated Sep. 25, 2015, 11 pages.
U.S. Appl. No. 14/311,166—Non Final Office Action dated Oct. 8, 2015, 17 pages.

* cited by examiner

OBJECT DETECTION AND TRACKING WITH AUDIO AND OPTICAL SIGNALS

RELATED APPLICATION

The application claims the benefit of U.S. provisional Patent Application No. 61/750,007, entitled, "OBJECT DETECTION AND TRACKING WITH AUDIO AND OPTICAL SIGNALS," filed on Jan. 8, 2013. The provisional application is hereby incorporated by reference for all purposes.

FIELD OF THE TECHNOLOGY DISCLOSED

The present disclosure relates generally to imaging systems and in particular to three-dimensional (3D) object detection, tracking and characterization.

BACKGROUND

Motion capture has numerous applications. For example, in filmmaking, digital models generated using motion capture can be used as the basis for the motion of computer-generated characters or objects. In sports, motion capture can be used by coaches to study an athlete's movements and guide the athlete toward improved body mechanics. In video games or virtual reality applications, motion capture facilitates interaction with a virtual environment in a natural way, e.g., by waving to a character, pointing at an object, or performing an action such as swinging a golf club or baseball bat. The term "motion capture" refers generally to processes that capture movement of a subject in three-dimensional (3D) space and translate that movement into, for example, a digital model or other representation.

Motion-capture systems may utilize one or more cameras to capture sequential images of an object in motion, and computers to analyze the images to reconstruct an object's shape, position, and orientation as a function of time. For 3D motion capture, at least two cameras are typically used. In order to accurately track motion in real or near-real time, the camera(s) of motion-capture systems typically operate at a frame rate of at least 15 image frames per second.

Additionally, the control of motion-capture systems can be less than intuitive for users who have become accustomed to touch-screen devices; the free-form gestures easily recognized by optical sensors often do not correspond to touch gestures.

SUMMARY

The technology disclosed addresses these problems by supplementing optical gesture recognition with the ability to recognize touch gestures. This capability allows the user to execute intuitive gestures involving contact with a surface. For example, in low-light situations where free-form gestures cannot be recognized optically with a sufficient degree of reliability, a device implementing the invention may switch to a touch mode in which touch gestures are recognized.

In one implementation, two contact microphones or other vibratory or acoustical sensors, that are coupled to an optical motion-capture and are in contact with a surface that a user touches, are monitored. When the contact microphones detect audio signals (or other vibrational phenomena) generated by contact of an object with the surface that the user touches, a position of the object traveling across and in contact with the surface is tracked. In some implementations, the position is tracked by measuring a time difference of arrival (TDOA) of the audio signals at the contact microphones and mapping surface locations that satisfy the TDOA, analyzing at least one image, captured by a camera of the optical motion-capture system, of the object in contact with the surface, and using the image analysis to select among the mapped TDOA surface locations as a surface location of the contact.

In other implementations, a path of the object is calculated by repeatedly measuring TDOAs of the audio signals at the contact microphones responsive to successive contacts of the object with the surface and analyzing a sequence of images of the successive contacts of the object with the surface.

Other aspects and advantages of the present technology can be seen on review of the drawings, the detailed description and the claims, which follow.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various implementations of the technology disclosed are described with reference to the following drawings, in which.

DETAILED DESCRIPTION

Implementations of the technology disclosed relate to methods and systems for capturing motion and/or determining the path of an object traveling across a surface based on a sequence of images and audio signals. For example, a sequence of images can be correlated to construct a 3-D model of the object, including its position and shape. A succession of images can be analyzed using the same technique to model motion of the object such as free-form gestures. In low-light situations, where free-form gestures cannot be recognized optically with a sufficient degree of reliability, audio signals can supply the direction and location of the object as further described herein.

Figure 1:
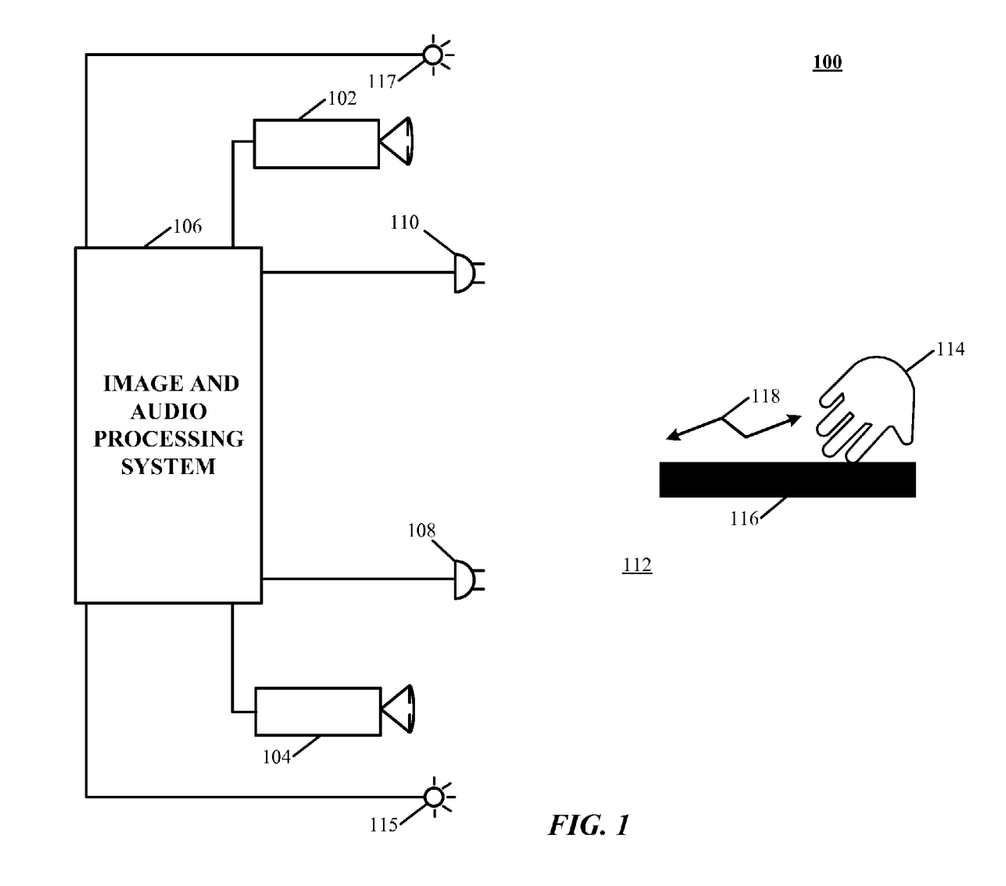
FIG. 1 illustrates a system for capturing image and audio data according to an implementation of the technology disclosed.

Refer first to FIG. 1, which illustrates a system 100 for capturing image and audio data according to one implementation of the technology disclosed. System 100 includes a pair of cameras 102, 104 coupled to an image and audio processing system 106. Cameras 102, 104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 102, 104 are preferably capable of capturing video images (i.e., successive image frames at a constant rate of at least 15 frames per second), although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

The illustrated system 100 also includes a pair of microphones 108, 110 coupled to the image and audio processing system 106. Microphones 108, 110 can be any type of microphone useful for obtaining audio signals from a surface, e.g., microphones that use electromagnetic induction (dynamic microphones), capacitance change (condenser microphones), piezoelectric response, or light modulation to produce an electrical signal from mechanical vibration; more generally, the term "microphone" herein refers to any device (or combination of devices) capable of converting mechanical vibration into an electrical signal.

Microphones 108, 110 are preferably capable of capturing audio signals as they propagate through a surface; for example, the microphones 108, 110 may be contact microphones. Such devices, otherwise known as pickups or piezos, are designed to sense audio vibrations through solid objects. Unlike normal air microphones, contact microphones have little sensitivity to air vibrations and transduce only structure-borne sound. Commonly available contact microphone elements include a thin piezoelectric ceramic round glued to a thin brass or alloy metal disc. More recently, flexible PVDF fluoropolymer piezo films have been used as contact microphones.

In operation, cameras 102, 104 are oriented toward a region of interest 112, that includes at least a portion of a surface 116, in which an object of interest 114 (in this example, a hand) moves across and in contact with the surface 116 along the indicated path 118. The microphones 108, 110 are positioned for contact with surface 116 for capturing audio signals propagating there through. In some implementations, one or more light sources 115, 117 are arranged to illuminate the region of interest 112. In some implementations, one or more of the cameras 102, 104 are disposed opposite the motion to be detected, e.g., where the hand 114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Image and audio processing system 106, which can be, e.g., a computer system, can control the operation of microphones 108, 110 and cameras 102, 104 to capture images of the region of interest 112 and audio signals propagating through surface 116. Based on the captured images and audio signals, image and audio processing system 106 determines the position and/or motion of object 114.

For example, as an action in determining the motion of object 114, image and audio processing system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 102, 104 allows image and audio processing system 106 to determine the location in 3D space of object 114, and analyzing sequences of images allows image and audio processing system 106 to reconstruct 3D motion of object 114 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

For example, in low-light situations where free-form gestures cannot be recognized optically with a sufficient degree of reliability, system 106 may switch to a touch mode in which touch gestures are recognized. Alternatively, system 106 may switch to the touch mode, or supplement image capture and processing with touch sensing, when signals from microphones 108, 110 are sensed. In still another operational mode, a tap or touch gesture may act as a "wake up" signal to bring the image and audio analysis system 106 from a standby mode to an operational mode. For example, the system 106 may enter the standby mode if optical signals from the cameras 102, 104 are absent for longer than a threshold interval. Because the microphones 108, 110 can generate detectable electrical signals without external power, the system 106 may contain an ultra-low-power wake-up circuit such as those designed for low-voltage detection (for example, the Microchip AN879 module).

In determining the motion of object 114, image and audio processing system 106 can determine its location and direction by computationally analyzing the audio signals captured by microphones 108, 110. For example, any part of object 114 that comes in contact with surface 116 can be classified as a "source" of the audio signals captured. The mechanical vibrations that can be interpreted as sound are able to travel through all forms of matter: gases, liquids, solids, and plasmas. The matter that supports the sound is called the medium. For example, surface 116 may be a solid material—e.g., one with enough surface texture to generate contact noise when rubbed. One conventional approach to obtaining the source direction of an audio signal in such an environment is the time difference of arrival (TDOA) method. Wikipedia, at http://en.wikipedia.org/w/index.php?title=Acoustic_source localization&oldid=529531982, Acoustic source localization, on Dec. 24, 2012, 03:28 UTC.

"With a microphone array consisting of at least two microphones it is possible to obtain the source direction using the cross-correlation function between each microphone's signal. For example, the cross-correlation function between two microphones is defined as $$R_{x_1,x_2}(\tau) = \sum_{n=-\infty}^{\infty} x_1(n)x_2(n+\tau)$$

which defines the level of correlation between the outputs of two microphones $x_1$ and $x_2$. In general, a higher level of correlation means that the argument $\tau$ is relatively close to the actual TDOA. For two microphones next to each other, the TDOA is given by $$\tau_{true} = \frac{d_{spacing}}{c}$$

where C is the speed of sound in the medium of surface 116." Ibid. It can be assumed that the medium of surface 114 is one commonly used for desk or table tops, such as wood, for which a value of is known. Image and audio processing system 106 can be configured in various ways to ascertain the medium of surface 116 and/or the speed of sound propagation in that medium.

In one implementation, image and audio processing system 106 stores a table of audio signatures—i.e., response characteristics—produced by a specific gesture (e.g., a finger swipe) performed on various surfaces. The user is instructed to perform this gesture when the system is first used on a particular surface, and the response characteristics are detected by image and audio processing system 106 (via microphones 108, 110) and compared to find the best-matching signature. Each signature is associated with a particular medium and, more importantly, the speed of sound therein. Accordingly, when the best-matching signature is located, the associated value of is used.

"Multilateration is a navigation technique based on the measurement of the difference in distance to two or more stations at known locations that broadcast signals at known times. See Wikipedia, at http://en.wikipedia.org/w/index.php?title=Multilateration&oldid=523281858, on Nov. 16, 2012, 06:07 UTC, Multilateration (incorporated by reference link in Wikipedia, Acoustic source localization). Unlike measurements of absolute distance or angle, measuring the difference in distance results in an infinite number of locations that satisfy the measurement. When these possible locations are plotted, they form a hyperbolic curve. To locate the exact location along that curve, a second measurement is taken to a different pair of stations to produce a second curve, which intersects with the first. When the two are compared, a small number of possible locations are revealed, producing a "fix." In simple terms, with two receivers at known locations, an emitter can be located onto a hyperboloid. Note that the receivers do not need to know the absolute time at which the pulse was transmitted—only the time difference is needed. Ibid.

In some implementations, audio signals outside a defined range will be excluded from analysis by a filter to remove background noise. Once again, the properties of the medium as identified by signal matching can be used to define the characteristics of a suitable filter, which may be implemented in software or controllable hardware by image and audio processing system 106.

Figure 2:
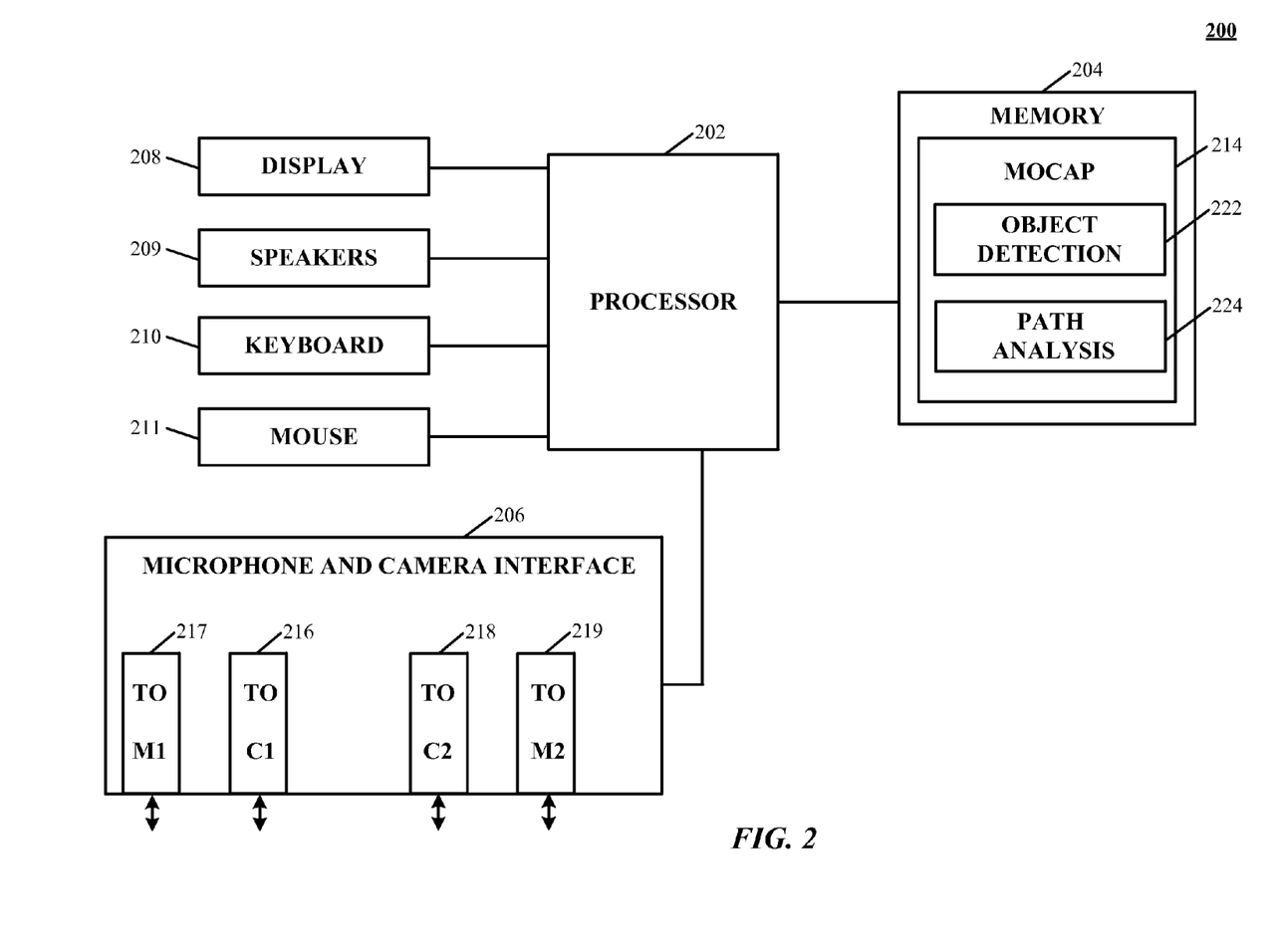
FIG. 2 is a simplified block diagram of a computer system implementing an image analysis apparatus according to an implementation of the technology disclosed.

Refer now to FIG. 2, which shows a simplified block diagram of a computer system 200 for implementing image and audio processing system 106. Computer system 200 includes a processor 202, a memory 204, a microphone and camera interface 206, a display 208, speakers 209, a keyboard 210, and a mouse 211. Memory 204 can be used to store instructions to be executed by processor 202 as well as input and/or output data associated with execution of the instructions. In particular, memory 204 contains instructions, conceptually illustrated as a group of modules described in greater detail below, that control the operation of processor 202 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 202 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Microphone and camera interface 206 can include hardware and/or software that enables communication between computer system 200 and cameras 102, 104, as well as microphones 108, 110 (see FIG. 1). Thus, for example, microphone and camera interface 206 can include one or more camera data ports 216, 218 and microphone ports 217, 219 to which the cameras and microphones can be connected (via conventional plugs and jacks), as well as hardware and/or software signal processors to modify data signals received from the cameras and microphones (e.g., to reduce noise or reformat data) prior to providing the signals as inputs to a motion-capture ("mocap") program 214 executing on processor 202. In some implementations, microphone and camera interface 206 can also transmit signals to the cameras and microphones, e.g., to activate or deactivate them, to control camera settings (frame rate, image quality, sensitivity, etc.), to control microphone settings (calibration, sensitivity levels, etc.), or the like. Such signals can be transmitted, e.g., in response to control signals from processor 202, which may in turn be generated in response to user input or other detected events.

Instructions defining mocap program 214 are stored in memory 204, and these instructions, when executed, perform motion-capture analysis on images supplied from cameras and audio signals from microphones connected to microphone and camera interface 206. In one implementation, mocap program 214 includes various modules, such as an object analysis module 222 and a path analysis module 224. Object analysis module 222 can analyze images (e.g., images captured via interface 206) to detect edges of an object therein and/or other information about the object's location. Object analysis module 222 can also analyze audio signals (e.g., audio signals captured via interface 206) to localize the object by, for example, triangulation as discussed above. Path analysis module 224 can track and predict object movements in 3D based on information obtained via the cameras. Audio signals place the object on a known surface, and the strength and variation of the signals can be used to detect object's presence. Successive camera images are analyzed at the pixel level to extract object movements and velocities. If both audio and image information is simultaneously available, both types of information can be analyzed and reconciled to produce a more detailed and/or accurate path analysis.

Display 208, speakers 209, keyboard 210, and mouse 211 can be used to facilitate user interaction with computer system 200. These components can be of generally conventional design or modified as desired to provide any type of user interaction. In some implementations, results of motion capture using microphone and camera interface 206 and mocap program 214 can be interpreted as user input. For example, a user can perform hand gestures or motions across a surface that are analyzed using mocap program 214, and the results of this analysis can be interpreted as an instruction to some other program executing on processor 200 (e.g., a web browser, word processor, or other application). Thus, by way of illustration, a user might use upward or downward swiping gestures to "scroll" a webpage currently displayed on display 208, to use rotating gestures to increase or decrease the volume of audio output from speakers 209, and so on. Path analysis module 224 may represent the detected path as a vector and extrapolate to predict the path, e.g., to improve rendering of action on display 208 by anticipating movement.

It will be appreciated that computer system 200 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of object analysis module 222 by processor 202 can cause processor 202 to operate microphone and camera interface 206 to capture images and/or audio signals of an object traveling across and in contact with a surface to detect its entrance by analyzing the image and/or audio data.

Figure 3A:
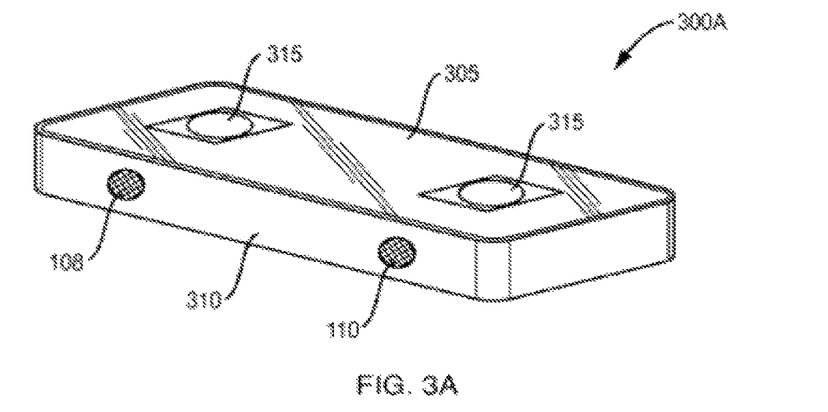
FIG. 3A is a perspective view from the top of a sensor in accordance with the technology disclosed, with microphones along an edge surface thereof.
Figure 3B:
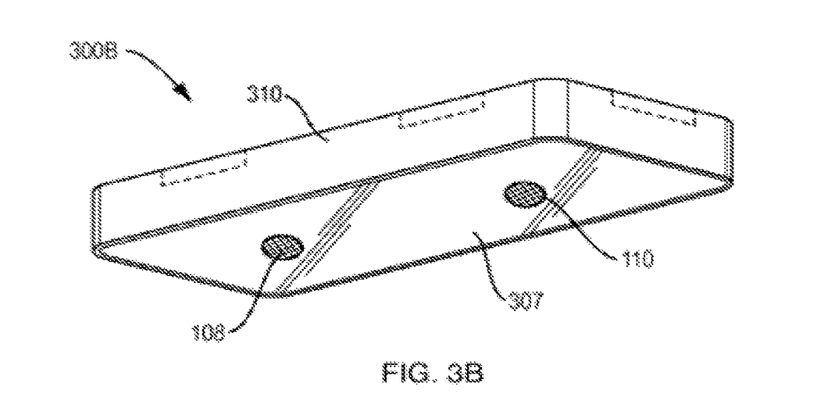
FIG. 3B is a perspective view from the bottom of a sensor in accordance with the technology disclosed, with microphones along the bottom surface thereof.
Figure 3C:
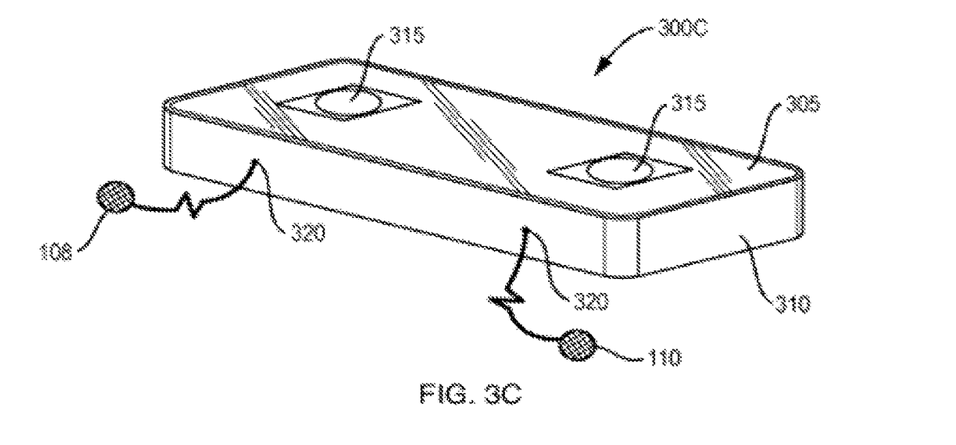
FIG. 3C is a perspective view from the top of a sensor in accordance with the technology disclosed, with detachable microphones configured for placement on a surface.

FIGS. 3A-3C illustrate three different configurations of system 100, all packaged within a single housing as an integrated sensor. In all cases, sensor 300A, 300B, 300C includes a top surface 305, a bottom surface 307, and a side wall 310 spanning the top and bottom surfaces 305, 307. With reference also to FIG. 1, the top surface 305 of sensor 300A contains a pair of windows 315 for admitting light to the cameras 102, 104, one of which is optically aligned with each of the windows 315. If the system includes light sources 115, 117, surface 305 may contain additional windows for passing light to the object(s) being tracked.

In sensor 300A, microphones 108, 110 are located on the side wall 310. Desirably, the microphones are flush with the surface of side wall 310 so that, with this surface in contact with a table or other bearing surface, the microphones are in contact with the bearing surface. Of course, the microphones can be recessed slightly from side wall 310 in order to prevent frictional damage so long as acoustic coupling to the bearing surface remains adequate. This configuration allows the sensor 300A to be positioned to face objects in contact with and traveling across the bearing surface, so that tracking can be based simultaneously on optical and audio signals.

In sensor 300B, microphones 108, 110 are located on the bottom surface 307, once again in a flush or slightly recessed configuration. The top surface of the sensor 300B (not shown in the figure) contains camera windows 315 as shown in FIG. 3A. This arrangement is well-suited to applications in which the sensor is primarily used for optical tracking above the bearing surface, and audio tracking based on movements along and in contact with the bearing surface represent an alternative operational mode—e.g., the user may tap the bearing surface in order to "wake up" sensor 300B from a standby mode.

In FIG. 3C, microphones 108, 110 are external contact transducers that connect to sensor 300A via audio jacks 320. This configuration permits the microphones to be located away from the sensor, e.g., if the sensor does not rest on the surface with which tracked objects make contact.

It will be appreciated that the figures shown in FIGS. 3A-3C are illustrative. In some implementations, it may be desirable to house the system 100 in a differently shaped enclosure or integrated within a larger component or assembly. Furthermore, the microphones are depicted as small cylindrical discs, but neither the size nor the shape is critical.

Figure 4:
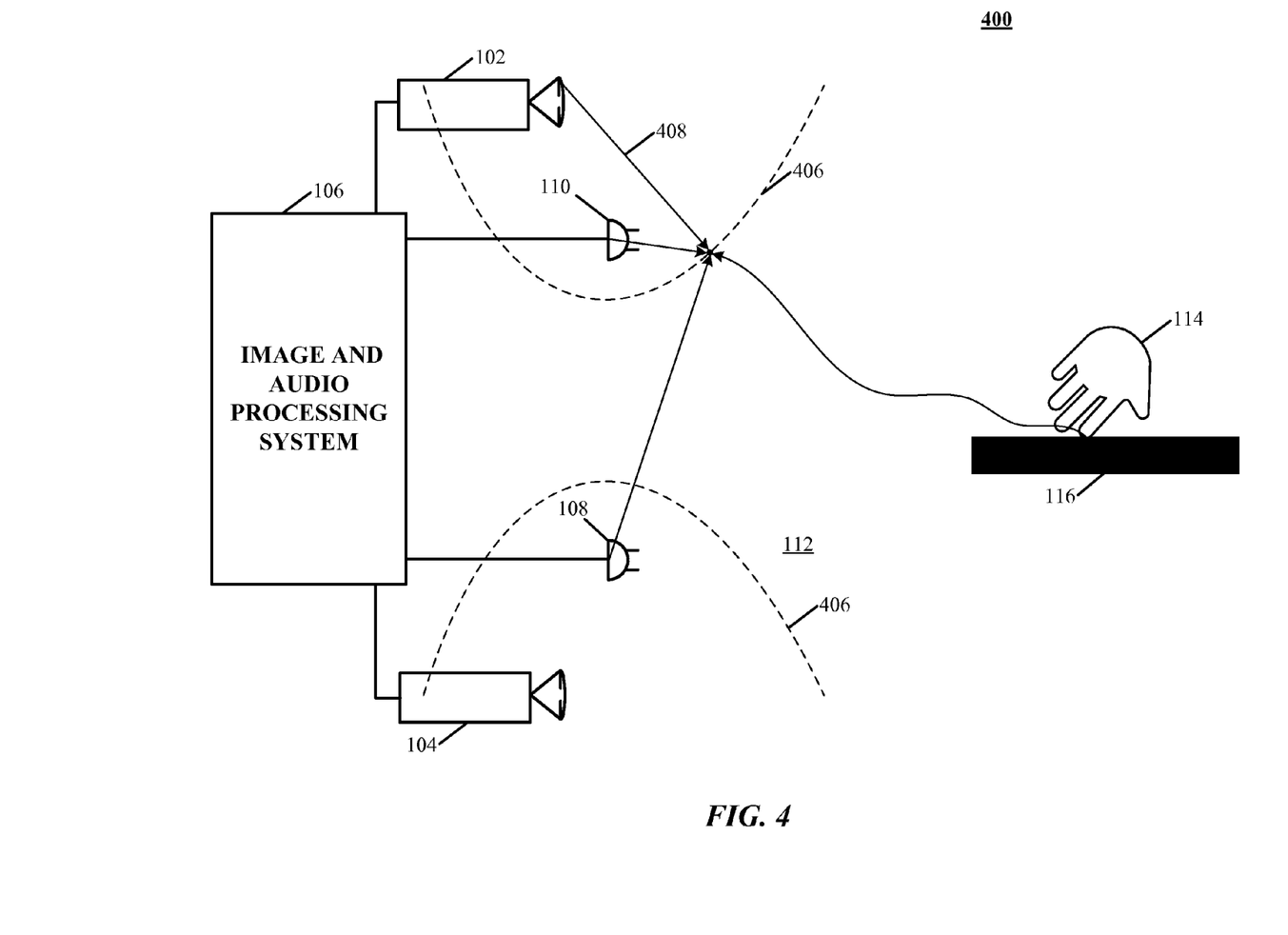
FIG. 4 illustrates one implementation of a system for measuring a time difference of arrival (TDOA) of the audio signals at contact microphones and mapping surface locations that satisfy the TDOA.

FIG. 4 illustrates one implementation of a system 400 for measuring a time difference of arrival (TDOA) of the audio signals at contact microphones and mapping surface locations that satisfy the TDOA. In particular, when object 114 comes in contacts with surface 116, the resulting mechanical vibrations generate audio signals. These audio signals are detected by contact microphones 108 and 110 at difference times due the different distance of the microphones 108 and 110 from the object 114. The time difference information is then used to form a hyperbola 406, with the contact microphones 108 and 110 as its foci. In one implementation, in the context of 3D space, the time difference information for a given pair of contact microphones can be used to construct a hyperboloid. Because every point on the hyperbola 406 is a possible location of object 114, an optical signal 408 from camera 102 is used to locate a unique position of object 114 at an intersection point between the optical signal 408 and hyperbola 406. This intersection point gives the position of object 114, as shown in FIG. 4.

Figure 5:
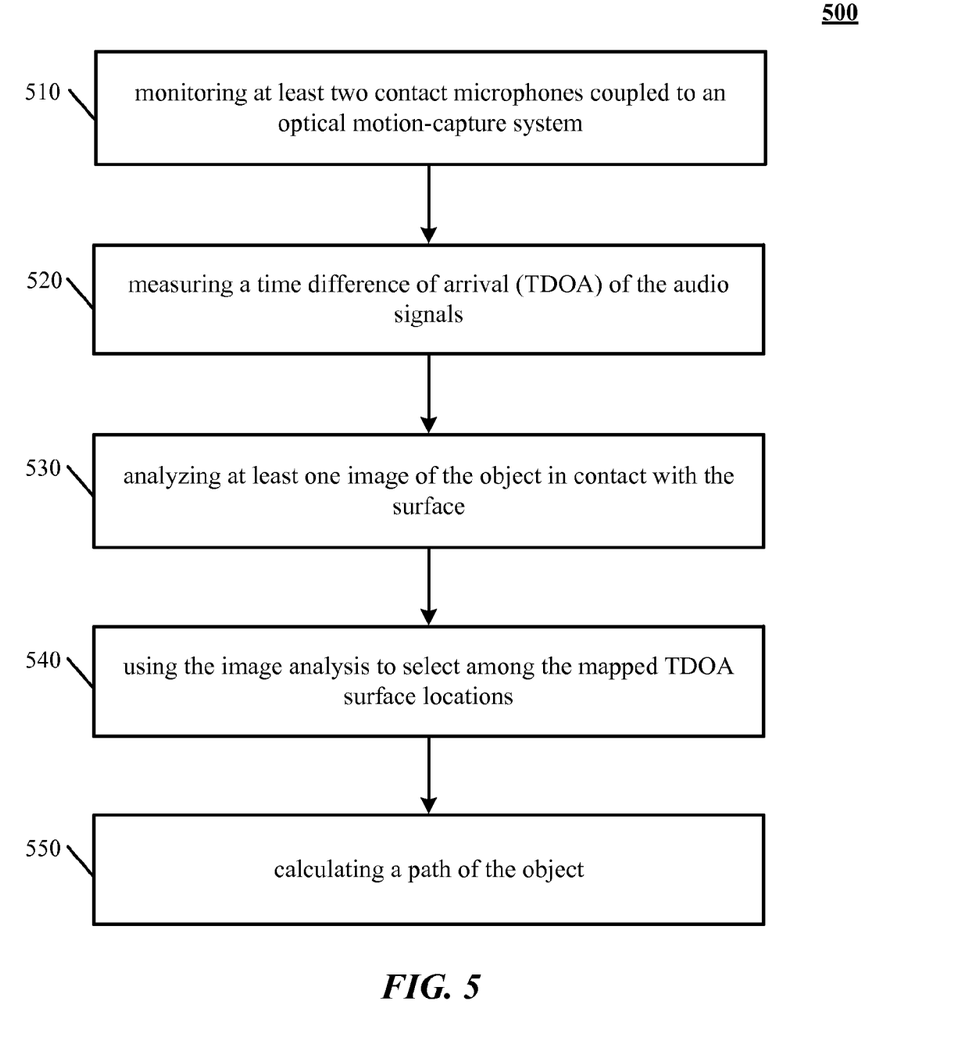
FIG. 5 shows a flowchart of one implementation of detecting and tracking an object with audio and optical signals.

FIG. 5 shows a flowchart 500 of one implementation of detecting and tracking an object with audio and optical signals. Flowchart 500 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this flowchart is described with reference to the system that carries out a method. The system is not necessarily part of the method.

At action 510, least two contact microphones, which are coupled to an optical motion-capture system and are in contact with a surface that a user touches, are monitored. In one implementation, the contact is a touch, tap, sequence of taps, or swiping motions of an object traveling across and in contact with a surface. In another implementation, the contact microphones are omnidirectional. In yet another implementation, the contact microphones are surface microphones.

At action 520, a time difference of arrival (TDOA) of the audio signals at the contact microphones is measured and surface locations that satisfy the TDOA are mapped. These audio signals are detected by contact microphones at difference times due the different distance of the microphones from an object that generate the audio signals. In one implementation, the time difference information is used to form a hyperbola or hyperboloid for identifying a unique position of the object. In one implementation, an audio test signal is applied to the surface and a return signal received is by the contact microphone during application of the test signal. The return signal is then compared to stored signals associated with a plurality of media, a stored signal best that matches the return signal is selected, and the audio signals are filtered based on the selected stored signal.

At action 530, at least one image, captured by a camera of the optical motion-capture system, of the object in contact with the surface is analyzed. In some implementations, any pixel in an image can be classified as an "object" pixel or a "background" pixel depending on whether that pixel contains a portion of object or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using the camera to capture images of the object and analyzing the images to detect object edges. Correlating object positions between images from the camera allows image and audio processing system 106 to determine the location in 3D space of object, and analyzing sequences of images allows image and audio processing system 106 to reconstruct 3D motion of object using motion algorithms.

At action 540, image analysis is used to select among the mapped TDOA surface locations as a surface location of the contact. In one implementation, an optical signal from camera is used to locate a unique position of object at an intersection point between the optical signal and the hyperbola.

At action 550, a path of the object is calculated by repeatedly measuring TDOAs of the audio signals at the contact microphones responsive to successive contacts of the object with the surface and analyzing a sequence of images of the successive contacts of the object with the surface.

While the invention has been described with respect to specific implementations, one skilled in the art will recognize that numerous modifications are possible. The number and arrangement of cameras and microphones can be varied. The cameras' capabilities, including frame rate, spatial resolution, and intensity resolution, can also be varied as desired. The microphones' capabilities, including sensitively levels and calibration, can also be varied as desired. Light sources are optional and can be operated in continuous or pulsed mode. The systems described herein provide images and audio signals to facilitate tracking movement of an object across a surface, and this information can be used for numerous purposes, of which position and/or motion detection is just one among many possibilities.

Threshold cutoffs and other specific criteria for distinguishing object from background can be adapted for particular cameras and particular environments. Frequency filters and other specific criteria for distinguishing audio signals from background noise can be adapted for particular microphones and particular surfaces. In some implementations, the system can be calibrated for a particular environment or surface medium, e.g., by adjusting frequency filters, threshold criteria, and so on.

Any type of object can be the subject of motion capture using these techniques, and various aspects of the implementation can be optimized for a particular object. For example, the type and positions of cameras and/or microphones can be optimized based on the size of the object whose motion is to be captured, the space in which motion is to be captured, and/or the medium of the surface through which audio signals propagate. Analysis techniques in accordance with implementations of the technology disclosed can be implemented as algorithms in any suitable computer language and executed on programmable processors. Alternatively, some or all of the algorithms can be implemented in fixed-function logic circuits, and such circuits can be designed and fabricated using conventional or other tools.

Computer programs incorporating various features of the technology disclosed may be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the invention has been described with respect to specific implementations, it will be appreciated that the invention is intended to cover all modifications and equivalents within the scope of the following claims.

What is claimed is:

1. A method of operating an optical motion-capture system in low-light situations, the method including:
    monitoring at least two contact microphones coupled to the optical motion-capture system, wherein the contact microphones are in contact with a surface; and
    in response to detection of audio signals generated by contact of an object with the surface determining a surface location by:
    measuring a time difference of arrival (TDOA) of the audio signals at the contact microphones and mapping a curve, including a plurality of possible surface locations of the contact, using the measured time difference of arrival;
    analyzing at least one image, captured by a camera of the optical motion-capture system, of the object in contact with the surface; and
    using the image analysis, selecting one of the plurality of possible surface locations included in the mapped curve, as the surface location of the contact;
    repeatedly measuring time difference of arrival of the audio signals at the contact microphones responsive to successive contacts of the object with the surface; and
    analyzing a sequence of images of the successive contacts of the object with the surface; thereby calculating a path of the object traveling across and in contact with the surface.

2. The method of claim 1, further including comparing the path to a plurality of path templates and identifying a template that best matches the path.

3. The method of claim 1, further including constructing a 3D model of the object and tracking movement thereof over the surface based on the sequence of images and the audio signals.

4. The method of claim 1, further including recognizing at least one of an image sequence or an audio signal that indicates a trajectory of the object.

5. The method of claim 1, further including recognizing at least one of an image sequence or an audio signal that indicates a gesture of the object.

6. A method of tracking a path of an object of interest traveling across and in contact with a surface, the method comprising:
    capturing, with a camera, a sequence of images of a field of view that includes at least a portion of the surface;
    capturing audio signals through the surface using at least two microphones;
    computationally constructing a 3D model of the object and tracking movement of the object over the surface based on the sequence of images and the audio signals, including;
    measuring a time difference of arrival (TDOA) of the audio signals at the microphones and mapping a curve, including a plurality of possible surface locations of the object, using the captured audio signals;
    analyzing at least one of the sequence of images; and using the image analysis, selecting one of the plurality of possible surface locations, included in the mapped curve, as a position of the object; and
    repeatedly measuring time difference of arrival of the audio signals at the microphones and performing the mapping, the analyzing and the selecting responsive to additional contacts of the object with the surface, thereby determining a path for the object traveling across the surface.

7. The method of claim 6, wherein the 3D model includes a shape of the object.

8. The method of claim 6, wherein tracking movement includes calculating a direction of the object by computationally analyzing the audio signals.

9. The method of claim 8, wherein the position and direction of the object are calculated using a time difference of arrival of the audio signals at the microphones.

10. The method of claim 6, further including filtering the audio signals to exclude frequencies outside a defined range.

11. The method of claim 6, further including recognizing at least one of an image sequence or an audio signal that indicates a trajectory or a gesture of the tracked object.

12. The method of claim 11, wherein the trajectory or the gesture dictates a change in operational mode.

13. An optical motion-capture system, including:
    a camera for capturing images of an object within a field of view thereof;
    two contact microphones coupled to the camera and in contact with a surface; and
    a sensor for monitoring the contact microphones;
    a control module for tracking a position of the object, in response to detection of audio signals generated by contact of the object with the surface, by:
    measuring a time difference of arrival (TDOA) of the audio signals at the contact microphones and mapping a curve, including a plurality of possible surface locations of the contact, using the measured time difference of arrival;
    analyzing at least one image, captured by the camera of the optical motion-capture system, of the object in contact with the surface; and
    using the image analysis, selecting one of the plurality of possible surface locations included in the mapped curve, as the surface location of the contact;
    repeatedly measuring time difference of arrival of the audio signals at the contact microphones responsive to successive contacts of the object with the surface; and
    analyzing a sequence of images of the successive contacts of the object with the surface; thereby calculating a path of the object traveling across and in contact with the surface.

14. The system of claim 13, further configured to construct a 3D model of the object and tracking movement thereof over the surface based on the sequence of images and the audio signals.

15. The system of claim 13, further configured to recognize at least one of an image sequence or an audio signal that indicates a trajectory of the tracked object.

16. The system of claim 13, further configured to recognize at least one of an image sequence or an audio signal that indicates a gesture of the tracked object.

* * * * *